United States Patent
Schaeflein et al.

(10) Patent No.: US 9,605,589 B2
(45) Date of Patent: Mar. 28, 2017

(54) METHOD FOR ADJUSTING A BAROMETRIC CELL

(75) Inventors: Jochen Schaeflein, Stuttgart (DE); Andreas Gail, Blaichach (DE); Christian Rothe, Sonthofen (DE); Stefan Landerer, Sonthofen (DE); Anatolij Martens, Eislingen (DE); Jochen Laubender, Markgroeningen (DE); Stefan Bedoe, Stuttgart (DE); Christian Peschke, Stuttgart (DE); Jens Kreth, Oberriexingen (DE); Alina Krause, Stuttgart (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 724 days.

(21) Appl. No.: 14/002,409

(22) PCT Filed: Jan. 9, 2012

(86) PCT No.: PCT/EP2012/050237
§ 371 (c)(1),
(2), (4) Date: Dec. 3, 2013

(87) PCT Pub. No.: WO2012/116852
PCT Pub. Date: Sep. 7, 2012

(65) Prior Publication Data
US 2015/0110595 A1    Apr. 23, 2015

(30) Foreign Application Priority Data

Mar. 1, 2011   (DE) .................. 10 2011 004 917

(51) Int. Cl.
*F02B 37/18*   (2006.01)
*F02B 37/24*   (2006.01)

(52) U.S. Cl.
CPC ............. *F02B 37/186* (2013.01); *F02B 37/24* (2013.01); *F05D 2270/80* (2013.01); *Y02T 10/144* (2013.01)

(58) Field of Classification Search
CPC ........ F01D 17/10; F01D 17/105; F01D 17/16; F01D 17/165; F02B 37/138; F02B 37/186; F16C 7/06; F05D 2240/40; F05D 2260/50
(Continued)

(56) References Cited

U.S. PATENT DOCUMENTS 4,780,054 A    10/1988  Yano et al.
5,746,058 A     5/1998  Vertanen
(Continued)

FOREIGN PATENT DOCUMENTS

DE         69922302 T2    11/2005
DE      202006007250 U1     9/2007
(Continued)

OTHER PUBLICATIONS

International Search Report for PCT/EP2012/050237.
(Continued)

*Primary Examiner* — Sean J Younger
(74) *Attorney, Agent, or Firm* — Fishman Stewart PLLC

(57) ABSTRACT

A method for adjusting a barometric cell may include coupling the barometric cell to a control device via an actuating rod. The actuating rod may be movably mounted on a charging device in any desired position. The method may include applying a freely selectable pressure to the barometric cell so as to bring the actuating rod into contact with a stop, adjusting the barometric cell until a sensor registers a predefined value, and fixing the barometric cell on the charging device.

7 Claims, 1 Drawing Sheet

(58) Field of Classification Search
USPC .............................................................. 415/1
See application file for complete search history.

(56) References Cited

U.S. PATENT DOCUMENTS

| | | | |
|---|---|---|---|
| 6,155,048 | A | 12/2000 | Vertanen |
| 6,658,846 | B1 | 12/2003 | McEwan |
| 7,340,895 | B2 | 3/2008 | Noelle |
| 7,677,040 | B2 | 3/2010 | McEwan |
| 2005/0050888 | A1 | 3/2005 | McEwan |
| 2007/0051106 | A1 | 3/2007 | Jones |
| 2011/0079138 | A1* | 4/2011 | Storrie ..................... G01B 7/14 91/1 |

FOREIGN PATENT DOCUMENTS

| | | |
|---|---|---|
| DE | 102008045227 A1 | 1/2010 |
| DE | 102009029880 A1 | 12/2010 |
| DE | 102009054241 A1 | 5/2011 |

OTHER PUBLICATIONS

German Search Report for DE102011004917.7.
English Abstract for DE-102009054241.
English Abstract for DE-102009029880.
English Abstract for DE-102008045227.

* cited by examiner

METHOD FOR ADJUSTING A BAROMETRIC CELL

CROSS-REFERENCE TO RELATED APPLICATIONS

This application claims priority to German Patent Application 10 2011 004 917.7 filed Mar. 1, 2011, and International Patent Application PCT/EP2012/050237 filed on Jan. 9, 2012, both of which are hereby incorporated by reference in their entirety.

TECHNICAL FIELD

The present invention relates to a method for adjusting a barometric cell on a charging device. The invention furthermore relates to a charging device with a barometric cell for actuating a control device according to the preamble of claim 5.

BACKGROUND

Usually, exhaust gas turbochargers are equipped with actuating devices, for example pneumatic actuators, which actuate a control device, for example a variable turbine geometry or a wastegate valve. The actuating device in this case is activated via the engine control and moves a control rod, which on one end is coupled to the control device, i.e. for example the variable turbine geometry or the wastegate valve, and on the other hand is coupled to the barometric cell. The setting or adjusting of this barometric cell relative to the charging device so that a corresponding signal of the engine control can also be correctly implemented always causes difficulties.

From U.S. Pat. No. 7,340,895 B2 a method for adjusting a barometric cell on a charging device, in particular on an exhaust gas turbocharger, is known, in which initially the barometric cell is movably mounted on the charging device in a vertical position. An actuating rod of the barometric cell in this case is connected to a control device of the charging device, for example to a variable turbine geometry or a wastegate valve. In the vertical position, the barometric cell is now subjected to a predefined negative pressure, wherein the barometric cell because of the gravity assumes a natural position. Through the negative pressure in the barometric cell the actuating rod is brought into contact with a stop, wherein the adjusting of the actuating rod simultaneously also brings with it an adjusting of the entire barometric cell. In the now assumed position the barometric cell is fixed on the charging device, i.e. on the exhaust gas turbocharger. Disadvantageous, however, in this case is that the barometric cell always has to be vertically mounted on the charging device in order to be able to carry out the adjusting operation described before. At the same time, the accuracy that can be achieved with this method leaves much to be desired.

SUMMARY

The present invention therefore deals with the problem of stating an improved embodiment for a method for adjusting a barometric cell which in particular is characterized by easy realisability and high adjusting accuracy.

According to the invention, this problem is solved through the subjects of the independent claims. Advantages embodiments are subject of the dependent claims.

The present invention is based on the general idea of refining a method for adjusting a barometric cell for actuating a control device, in particular a variable turbine geometry or a wastegate valve on a charging device so that the barometric cell for carrying out the adjusting method need not assume a predefined position on the charging device and because of this the method can be carried out more easily and in addition a clearly improved adjusting accuracy can be achieved. With the method according to the invention, the barometric cell is coupled to the control device via an actuating rod and movably mounted on the charging device in any desired position. Following this, a freely selectable, i.e. almost random positive pressure/negative pressure is applied to the barometric cell which brings the actuating rod into contact with a stop. The barometric cell is now adjusted so far for example by means of an actuating device specifically provided for this purpose until a sensor registers a predefined value, for example an adjusting travel of the actuating rod. Following the sensing of the predefined value by the sensor, the barometric cell can be screwed tightly, i.e. fixed to the charging device. With the method according to the invention, that the adjustment utilises an exact sensor value, an accuracy of up to ±0.029 mm can be achieved, which is almost twice as precise as a known adjustment to an applied negative pressure/positive pressure which merely reaches an accuracy of ±0.053 mm. In addition, the method according to the invention for adjusting the barometric cell on the charging device has the major advantage that the barometric cell can be movably mounted on the charging device in any desired position and need not be brought into a vertical position beforehand, i.e. before starting the actual adjusting method. The method according to the invention is thus characterized by a clearly improved accuracy of the adjustment and at the same time a clearly simplified realisability. At the same time, the method according to the invention no longer depends on gravity for adjusting the barometric cell.

In an advantageous further development of the solution according to the invention, the sensor registers a travel of the actuating rod and is simultaneously integrated in the barometric cell. Integrating the sensor in the barometric cell protects it in particular from external influences, as a result of which its life expectancy can be clearly increased. The sensor, which is utilised with the method according to the invention for adjusting the barometric cell on the charging device can later on obviously supply also additional values, for example feedback to an engine control.

In a further advantageous embodiment of the solution according to the invention, an adjusting of the barometric cell is effected via an actuating device comprising at least one eccentric, which on the one side is connected to the barometric cell and on the other side to the charging device. The barometric cell in this case usually comprises a holding device, for example a metal bracket, via which the barometric cell is connected to the charging device. The eccentric is now connected on the one side to the charging device and on the other side to the holding device, wherein through a simple turning of the eccentric a relative movement of the holding device and thus of the barometric cell with respect to the charging device takes place. At the same time, the holding device and the charging device comprise further through-openings, through which on reaching a predefined end position, screws can be inserted and the barometric cell thereby fixed to the charging device. Instead of the eccentric, obviously elongated holes can also be provided, wherein the eccentric makes possible a particularly accurate since precise adjustment.

Further important features and advantages of the invention are obtained from the subclaims, from the drawings and from the associated figure description by means of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

Here it shows, in each case schematically.

DETAILED DESCRIPTION

Figure 2:
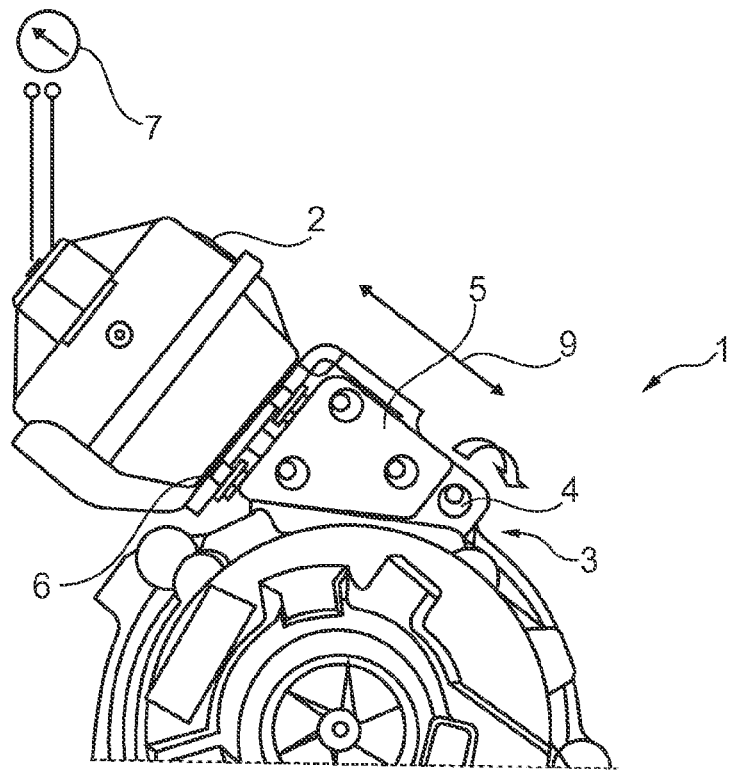

According to FIG. 2, a charging device 1, which for example can be embodied as an exhaust gas turbocharger, comprises a barometric cell 2 for actuating a control device which is not shown in more detail, in particular for actuating a variable turbine geometry or a wastegate valve of the charging device 1. At the same time, an actuating device 3 for adjusting the barometric cell 2 relative to the charging device 1 is provided, which comprises at least one eccentric 4 (see FIG. 3), which on the one side is connected to the barometric cell 2 or indirectly to the same via a holding device 5, and on the other side to the charging device 1. The barometric cell 2 in this case in the exemplary embodiment shown is connected via the holding device 5 to the charging device 1, i.e. in particular to a housing of the same.

Figure 1:
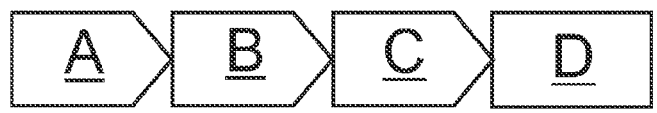
FIG. 1 individual method steps of a method according to the invention for adjusting a barometric cell on a charging device, FIG. 2 a charging device with an actuating device according to the invention, FIG. 3 an eccentric of the actuating device.

In order to be able to achieve as exact a control of the control device as possible, i.e. for example of the wastegate valve or of the variable turbine geometry, the barometric cell 2 has to be suitably adjusted on the charging device 1. To this end, a method according to the invention for adjusting the barometric cell 2 for actuating the control device on the charging device 1 is proposed, which according to FIG. 1 comprises a total of four method steps A to D.

The method according to the invention for adjusting the barometric cell 2 on the charging device 1 in this case takes place as follows: in the method step A, the barometric cell 2 is initially coupled to the control device via an actuating rod 6 and movably mounted in any desired position on the charging device 1 or on a housing of the same. Any desired position in this case is to mean in particular that the barometric cell 2 need not be vertically positioned on the charging device 1, as is usual up to now. In the method step B, a freely selectable positive pressure/negative pressure is subsequently applied to the barometric cell 2, which brings the control rod 6 into contact with a stop which is not described in more detail. Obviously, a freely selectable positive pressure/negative pressure in this case is to merely mean a positive pressure/negative pressure such as brings the actuating rod 6 into contact with the described stop. Obviously, this is not to mean negative pressures of any magnitude, in particular such as would result in a destruction of the barometric cell 2. In the method step C, the barometric cell 2 is now adjusted so far until a sensor 7 registers a predefined value. The sensor 7 according to FIG. 2 is arranged outside the barometric cell 2, however, in a preferred embodiment, can also be integrated in the barometric cell 2 and because of this can also be arranged in a particularly protected manner. In the following method step D, the barometric cell 2 is now fixed on the charging device 1, i.e. in particular screwed to it tightly. Fixing in this case can be effected in particular by screwing the holding device 5 tightly to the housing of the charging device 1.

In general, the sensor 7 can register a travel of the actuating rod 6, as a result of which a particularly accurate alignment of the barometric cell 2 relative to the charging device 1 or relative to the control device is possible. Adjusting the barometric cell 2 in the method step C in this case is brought about by way of the actuating device 3 already described above, which comprises at least one eccentric 4, which on the one side is connected to the barometric cell 2 and on the other side to the charging device 1. Expressed more precisely, the eccentric 4 is connected on the one side to the holding device 5 of the barometric cell 2 or a plate bracket, and on the other side to the housing of the charging device 1, for example to a turbine housing.

Figure 3:
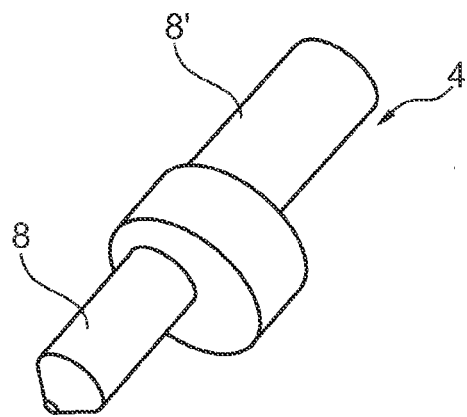

According to FIG. 3, a possible embodiment of the eccentric 4 is shown, wherein because of the eccentricity of at least one pin 8, 8' it is evident that turning the eccentric 4 about its longitudinal axis not only brings about a turning of at least one pin 8, 8' but simultaneously also a shifting of the same, as a result of which in turn the adjusting movement of the barometric cell 2 along the actuating device 9 (see FIG. 2) can be brought about. By means of the eccentric 4 according to the invention, a particularly accurate since fine adjustment of the barometric cell 2 is made possible here.

The method according to the invention in this case has the major advantage that it makes possible almost any arrangement of the barometric cell 2 on the charging device 1, so that it need not necessarily be arranged vertically. In addition to this, the adjusting accuracy is increased by almost double through the method according to the invention, so that the adjusting or setting operation cannot only be carried out more easily but also significantly more accurately at the same time, which in turn has a positive influence on the functionality.

The invention claimed is:

1. A method for adjusting a barometric cell comprising:
   coupling the barometric cell to a controller via an actuating rod, wherein the actuating rod is movably mounted on a charger in any desired position;
   applying a freely selectable, non-predetermined pressure to the barometric cell to bring the actuating rod into contact with a stop;
   adjusting the barometric cell until a sensor registers a predefined value; and
   fixing the barometric cell on the charger.

2. The method according to claim 1, wherein the sensor registers a travel of the actuating rod.

3. The method according to claim 2, wherein the adjusting of the barometric cell is done by an actuating device including at least one eccentric, the at least one eccentric being connected to the barometric cell at one side and to the charging device on the other side.

4. The method according to claim 2, wherein the sensor is integrated into the barometric cell.

5. The method according to claim 1, wherein the adjusting of the barometric cell is done via an actuator including at least one eccentric.

6. The method according to claim 5, further comprising turning the eccentric to adjust the barometric cell relative to the charger.

7. The method according to claim 5, wherein the eccentric connects to the barometric cell on one end and to the charging device on the other.

\* \* \* \* \*